(12) United States Patent
Kindt et al.

(10) Patent No.: US 7,173,741 B1
(45) Date of Patent: Feb. 6, 2007

(54) SYSTEM AND METHOD FOR HANDLING BAD PIXELS IN IMAGE SENSORS

(75) Inventors: Willem Johannes Kindt, Sunnyvale, CA (US); Alex Chung-Chun Lin, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 634 days.

(21) Appl. No.: 10/121,845

(22) Filed: Apr. 12, 2002

Related U.S. Application Data

(63) Continuation of application No. 09/736,494, filed on Dec. 13, 2000, now abandoned.

(51) Int. Cl.
*H04N 1/40* (2006.01)

(52) U.S. Cl. .................. 358/443; 358/447; 358/518; 348/246; 382/275

(58) Field of Classification Search .............. 358/443, 358/447, 518; 348/219.1, 275; 382/254
See application file for complete search history.

(56) References Cited

U.S. PATENT DOCUMENTS

| | | | | |
|---|---|---|---|---|
| 4,748,507 | A * | 5/1988 | Gural ................... | 348/219.1 |
| 5,657,400 | A * | 8/1997 | Granfors et al. .......... | 382/254 |
| 6,344,906 | B1 * | 2/2002 | Gatto et al. ............. | 358/443 |
| 6,674,404 | B1 * | 1/2004 | Lee et al. ............... | 348/275 |

* cited by examiner

*Primary Examiner*—Thomas D. Lee
*Assistant Examiner*—Heather D Gibbs
(74) *Attorney, Agent, or Firm*—Darby & Darby P.C.; Matthew M. Gaffney

(57) ABSTRACT

A method and apparatus for handling bad pixels in an image sensor array includes processing data values associated with the pixels of the image sensor. Processing the data values is performed by at least a first pass process and a subsequent pass process. In the first pass, the data values associated with the pixels are analyzed to determine whether any of the pixels are bad pixels. Information identifying the bad pixels is stored in a memory storage area of limited size. The stored information may also include an indicator, indicating a confidence level in categorizing the bad pixel. During the first pass, an overflow mark is stored in the memory storage area when insufficient memory storage is available for storing the information about a particular bad pixel. The overflow mark identifies the particular pixel in the image sensor array. During subsequent passes, processing may be redirected to the first pass to resume first pass processing of the data value associated with the particular pixel identified by the overflow mark. Based on information stored in the memory storage area, subsequent passes determine which data values are re-evaluated and whether the categorization of any particular bad pixel may be modified based on the re-evaluation. Corrected data values for each bad pixel may be determined by interpolating data values associated with neighboring pixels to each bad pixel. The first pass may be performed in response to a reset signal and the subsequent pass may be performed at a pre-determined time interval or event.

24 Claims, 11 Drawing Sheets

SYSTEM AND METHOD FOR HANDLING BAD PIXELS IN IMAGE SENSORS

TECHNICAL FIELD

The present invention relates to imaging systems, and more particularly to an imaging system that handles bad pixels within an image sensor.

BACKGROUND OF THE INVENTION

Image sensors are used in imaging devices such as digital cameras. Semiconductor-type image sensors are fabricated from silicon and are commonly arranged as a two-dimensional array of pixels (i.e., CMOS pixel array). During the semiconductor fabrication process, defects may occur in some of the pixels of the image sensor. Defective pixels used in an imaging device may result in visible defects in a processed image such as a bright or a dark spot in the processed image. The pixel with the defect is referred to as a "bad" pixel. Because the bad pixels appear as visible defects in the processed image, it is not desirable for an imaging device to use image sensors with bad pixels. Thus, the cost of manufacturing image sensors increases because only image sensors fabricated without bad pixels are available for use in imaging devices.

Given this high cost of manufacturing, there have been some attempts at using image sensors with bad pixels. For example, one attempt calibrates each image sensor during a final production test. The final test examines the pixel array and tests for bad pixels, storing the coordinates (i.e. row and column number) of the bad pixels in a programmable read only memory (PROM). The PROM may either be integrated into the image sensor device or may be shipped as a separate PROM. An imaging system may then use the information stored in the PROM to determine which of the pixels in the image sensor are bad and discard the outputs generated from those pixels. Interpolated outputs are generated to compensate for discarding the outputs of the bad pixels. The imaging system will generate each interpolated output value based on the output of pixels located near the bad pixel (i.e. adjacent pixels). This attempt, however, is very expensive because it requires the use of a PROM and an exhaustive calibration cycle during final test.

SUMMARY OF THE INVENTION

The present invention relates to an apparatus and a method for handling bad pixels in an image sensor array. In one embodiment, a method includes processing data values associated with the pixels of the image sensor. Processing data values includes at least a first pass process and a subsequent pass process. In the first pass, the data values associated with the pixels are analyzed to determine whether any of the pixels are bad pixels. Information identifying the bad pixels is stored in a memory storage area of limited size. The stored information may also include an indicator, indicating a confidence level in categorizing the bad pixel. During the first pass, an overflow mark is stored in the memory storage area when insufficient memory storage is available for storing the information about a particular bad pixel. The overflow mark identifies the particular pixel in the image sensor array. During subsequent passes, processing may be redirected to the first pass to resume first pass processing of the data value associated with the particular pixel identified by the overflow mark. Based on information stored in the memory storage area, subsequent passes determine which data values are re-evaluated and whether the categorization of any particular bad pixel may be modified based on the re-evaluation. Corrected data values for each bad pixel may be determined by interpolating data values associated with neighboring pixels to each bad pixel.

In one aspect of the invention, the first pass is performed in response to a reset signal. The reset signal may include signals triggered manually, automatically, or with a time-delay.

In another aspect of the invention, the subsequent pass re-evaluates and modifies the information in the memory at a pre-determined time interval or event, such as after a certain number of images have been captured. Alternatively, the subsequent pass may by-pass modifying the information stored in the memory based on a pre-determined trigger, such as once the first pass completes processing.

In still another aspect of the invention, the first pass identifies the one or more bad pixels by categorizing each of the plurality of pixels in one of several categories. The several categories include a first category for pixels meeting a first criterion and at least one other category representing pixels meeting other criteria. The first criterion and other criteria may be adjustable. In addition, the first pass may store a category identifier in the memory and a location identifier in the memory if the pixel is categorized in one of the other categories. The location identifier references a location in the image sensor associated with the pixel.

In yet a further aspect of the invention, the first pass and the subsequent pass may correct the data values and the subsequent data values associated with the one or more bad pixels, respectively. The corrected data values may be determined by interpolating between one or more neighboring pixels to the bad pixel. The corrected data values may then be output along with previous data values and subsequent data values of pixels that are not identified as bad pixels.

In another embodiment of the invention, a computer-readable medium having computer-executable instructions for performing the first pass and the subsequent pass is provided. The computer-readable medium may further include several data structures stored thereon. The data structures store information about one or more bad pixels. A first data structure includes at least one bit associated with each of the plurality of pixels in the image sensor array. For each pixel identified as a bad pixel, the associated at least one bit is set to a first state. For each pixel identified as a good pixel, the associated at least one bit is set to a second state. In one aspect of the invention, another bit may store a category identifier for the bad pixel. The category identifier may identify a good category, a certainly good category, a possibly bad category, and a certainly bad category.

In yet another embodiment of the invention, a computer-readable medium having several data structures stored thereon is provided. The data structures store information about one or more bad pixels out of several pixels in an image sensor array. A first data structure includes a location field and a status field. A category identifier is stored in the status field based on which of several categories the bad pixel is categorized. The several categories may include a good category, a certainly good category, a possibly bad category, and a certainly bad category. A location identifier associated with the bad pixel may be stored in the location field. The first data structure may correspond to one of several sections of the image sensor array.

In one aspect of the invention, the computer-readable medium may further include a second data structure. The second data structure may store an overflow mark. The overflow mark identifies a particular bad pixel that was being processed by a first pass when insufficient storage was available in the first data structure. During subsequent passes, the processing may be re-directed to the first pass so that the first pass resumes processing at the pixel previously identified by the overflow mark.

In still another embodiment of the invention, an apparatus that uses an image sensor array having one or more bad pixels out of several pixels is provided. The apparatus includes a processor coupled to the image sensor array. The processor is also coupled to a memory. A logic component, works in conjunction with the processor and the memory, to perform a first pass on first data values and one or more subsequent passes on subsequent data values. Each of the first data values and each of the subsequent data values are associated with one of the several pixels in the image sensor array. The first pass includes identifying the one or more bad pixels and storing information about the one or more bad pixels in a memory. The subsequent pass uses the information stored in the memory and re-evaluates the one or more bad pixels previously identified. If the re-evaluation identifies a change associated with the one or more bad pixels previously identified, the subsequent pass modifies the information stored in the memory. The logic may further be configured to identify the one or more bad pixels by determining into which of several categories each of the several pixels is categorized. The several categories may include a first category for pixels meeting a first criteria and at least one other category representing pixels meeting other criteria. In one aspect of the invention, the process may be configured to adjust the first criterion and other criteria. In still another aspect of the invention, the apparatus may include a reset signal that communicates with the logic component to determine when to perform the first pass.

DETAILED DESCRIPTION OF THE PREFERRED EMBODIMENT

Figure 1:
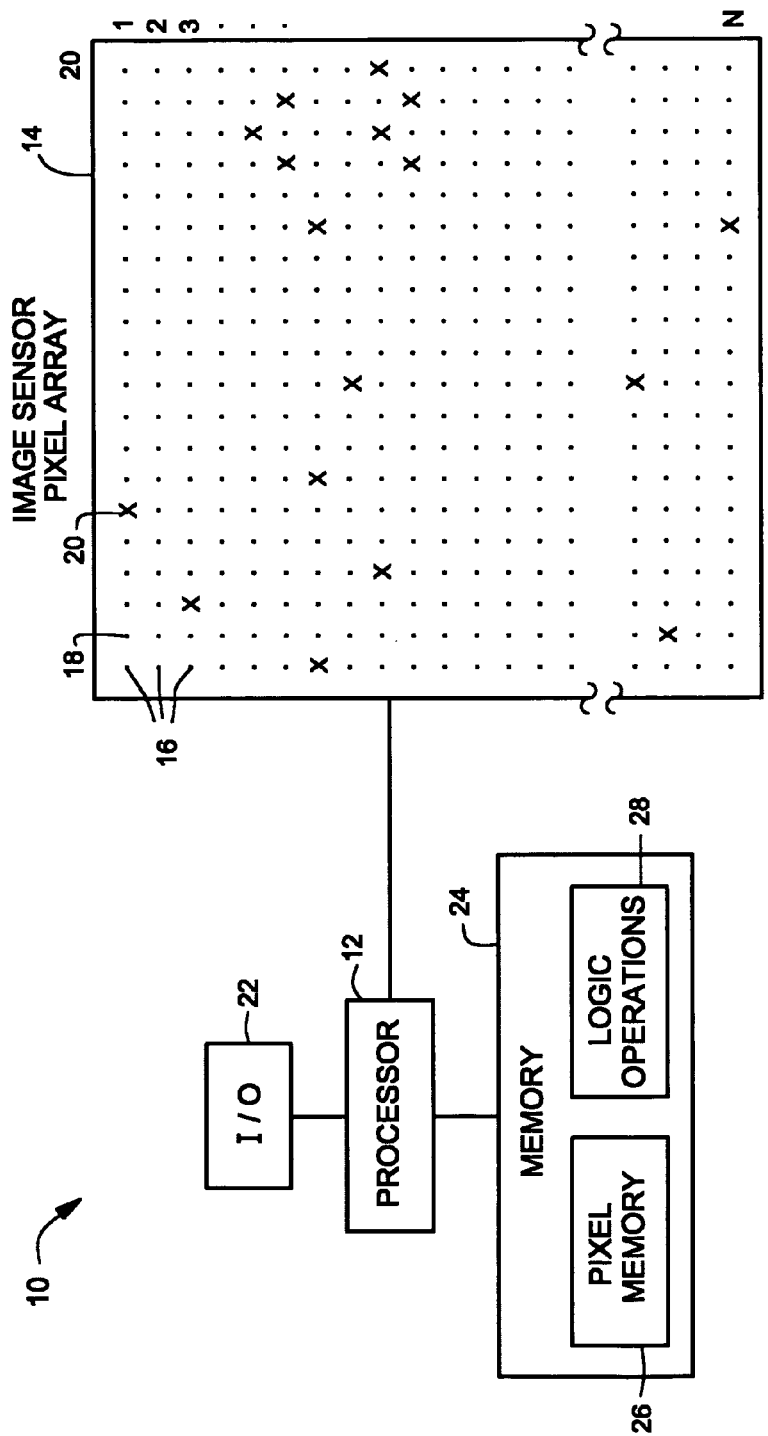
FIG. 1 is a block diagram of an exemplary embodiment of the components for an imaging system.

FIG. 1 is a block diagram illustrating an exemplary embodiment of components for an imaging system (10). Imaging system 10 includes an imaging device (i.e., a digital camera) that includes a processor (12) coupled to an image sensor pixel array (14). Image sensor pixel array 14 includes an array of pixels (16) arranged in columns (1 thru 20) and rows (1 thru N). Although the image sensor pixel array (14) depicted in FIG. 1 is shown having twenty rows and N columns of pixels, the image sensor pixel array may have any number of rows and columns of pixels without departing from the scope of the present invention. Each pixel 16 in image sensor pixel array 14 may be a good pixel (18, denoted with a dot) or a bad pixel (20, denoted with an "X"). Bad pixels 20 occur during the fabrication of the image sensor pixel array (14).

When an image is captured using an image sensor pixel array with a bad pixel, the bad pixel may cause a bright spot in the captured image due to a large leakage current in the bad pixel. In addition, initially good pixels may become bad pixels during operation. For example, initially good pixels may become bad pixels when the operating temperature increases or when the video gain is increased. Methods that evaluate (calibrate) the pixel array once during a fabrication/production test, and mark all bad pixel entries in a PROM will not correct for bad pixels that occur during operation. However, the present invention, as will be described below in detail, evaluates pixels during operation so no initial calibration is required during the fabrication of the image sensor and bad pixels that occur during operation of the imaging device may be detected.

Processor 12 is also coupled to an input/output (I/O) interface (22) and a memory (24). Memory 24 may be a read/writable memory, such as random access memory (RAM), static random access memory (SRAM), dynamic random access memory (DRAM), magnetic media (i.e. floppy disk, hard disk drive) or any other suitable computer-readable medium having computer-executable instructions.

The imaging system further includes an imaging post-processing device that includes a pixel memory (26), logic operations 28, and the processor 12. Pixel memory 26 stores information in memory 24 about the pixels (16) in the image sensor pixel array (14). Logic operations 28 may be a software module (i.e. a program), a wired logic circuit (i.e. an EPROM, ROM, PLA, PLD), or any other suitable combination of wired logic and software module. Logic operations 28 cooperate with processor 12 (hereinafter, jointly referred to as logic 29) to detect bad pixels (20) and to store the location of each bad pixel 20 in pixel memory 26. Further, logic 29 may correct the data associated with a bad pixel and output the corrected data through the input/output interface (22).

Although memory 24, processor 12, and input/output 22 are shown as separate blocks, it is understood and appreciated that the memory, processor and input/output blocks may be combined into one or more blocks. In one embodiment, the processor and input/output blocks may be in a single block such as a micro-controller. In another embodiment, logic instructions may be stored in a separate memory (RAM, ROM, EPROM, EEPROM, etc.) In yet another embodiment, the processor and logic operations may be integrated into a single block such as a micro-controller with a built-in EPROM. Any suitable combination of input/output, processor and memory may be implemented without departing from the present invention. Likewise, the imaging device and the imaging post-processing device are shown to include the same processor. However, a separate processor may be used for the imaging device and the imaging post-processing device.

Figure 2:
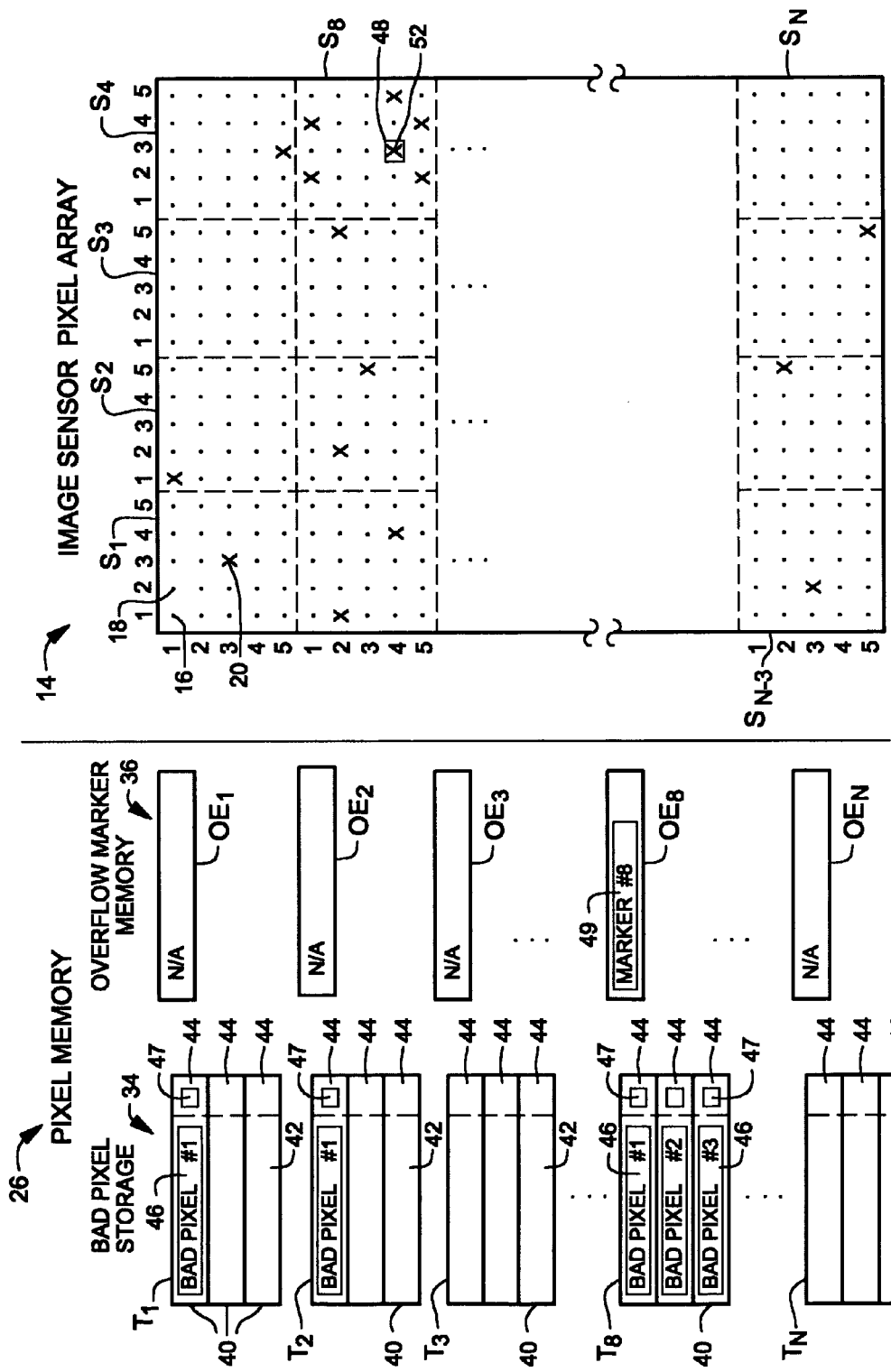
FIG. 2 is a representation of one embodiment of an image sensor pixel array and an associated pixel memory for use in the imaging system shown in FIG. 1.

FIG. 2 is a representation of one embodiment for an image sensor pixel array (14) and an associated pixel memory (26) used in the imaging device (10) shown in FIG. 1. Pixel memory 26 is used to store information about the pixels (16) from image sensor pixel array 14. As in FIG. 1, good pixels are represented by a dot (18) and bad pixels are represented by an "X" (20) in the image sensor pixel array (14). Image sensor pixel array 14 is divided into several sections ($S_{1-N}$). The sections (S) do not necessarily need to be identically sized, but for convenience and ease of implementation, the sections are shown identically sized. In one embodiment, the entire image sensor pixel array (14) may be one section of rows and columns. For convenience, the rows and columns of each section (S) have been sequentially numbered beginning with one. As one skilled in the art will appreciate, for identically sized sections, the last sections S, which include the last row (i.e., row N), may have a different number of rows than other sections if the number of rows is not evenly divisible.

Pixel memory 26 includes a bad pixel storage (34) and an overflow marker memory (36). In the embodiment illustrated in FIG. 2, the bad pixel storage 34 includes a plurality of tables $T_{1-N}$, each table corresponding to one of the several sections ($S_{1-N}$) in the image sensor pixel array (14), respectively. Each table T includes a plurality of entries (40) having a location field (42). The location field represents a physical location for the pixel in the image sensor pixel array 14. Any number of methods known in the art may be used for specifying location data in the location field, such as storing a pointer that counts the pixels from left to right, from top to bottom (i.e., a number between 0–307.199 for a 640×480 pixel array) or storing a coordinate pair that can sufficiently designate a certain pixel (i.e., x=123, y=362). The entries (40) may further include a confidence field (44).

Bad pixel identifier (46) is stored in the location field (42) when logic 29 determines that a given pixel is a bad pixel (20). In a subsequent pass, the logic (29) checks the bad pixel storage (34) to find any bad pixel identifiers (46) and applies a correction to the data associated with any of the bad pixels (20) that are found. Although, the tables (T) are shown with only three entries (40), one skilled in the art will appreciate that each table may have any number of entries (40). In addition, the bad pixel storage (34) may be a linked list, variable length tables, one table, or any other appropriate storage technique.

Section $S_8$ of image sensor pixel array 14 illustrates box 48 around an identified pixel (52). Briefly described, box 48 graphically illustrates one of the pixels (16) as the identified pixel (52). The identified pixel (52) is a pixel that the logic (29) was processing when the logic (29) determined that the there was insufficient pixel memory 26 available to store the pixel location of the identified pixel (52) after the logic (29) identified the pixel as a bad pixel. The location of the identified pixel 52 is stored in the overflow marker memory (36) of the pixel memory (26). In the embodiment shown in FIG. 2, the overflow marker memory (36) includes a plurality of overflow entries ($OE_{1-N}$) that are associated with sections $S_{1-N}$, respectively. An overflow identifier (49) identifying a bad pixel is stored in the overflow entry (OE) when the logic (29) determines that there is insufficient memory to store another location of a bad pixel in the associated table (T). For example, an overflow identifier (49) is stored in overflow entry $OE_8$ as "Marker #8". The overflow identifier (49) specifies the location in the image sensor pixel array (14) at which the logic (28) and the processor (12) resumes first pass processing. Several of the sections S do not have box 48 graphically illustrated. Sections S without box 48 indicate that there was sufficient pixel memory 26 (i.e. no memory overrun) to store all the bad pixels in that section.

Figure 3:
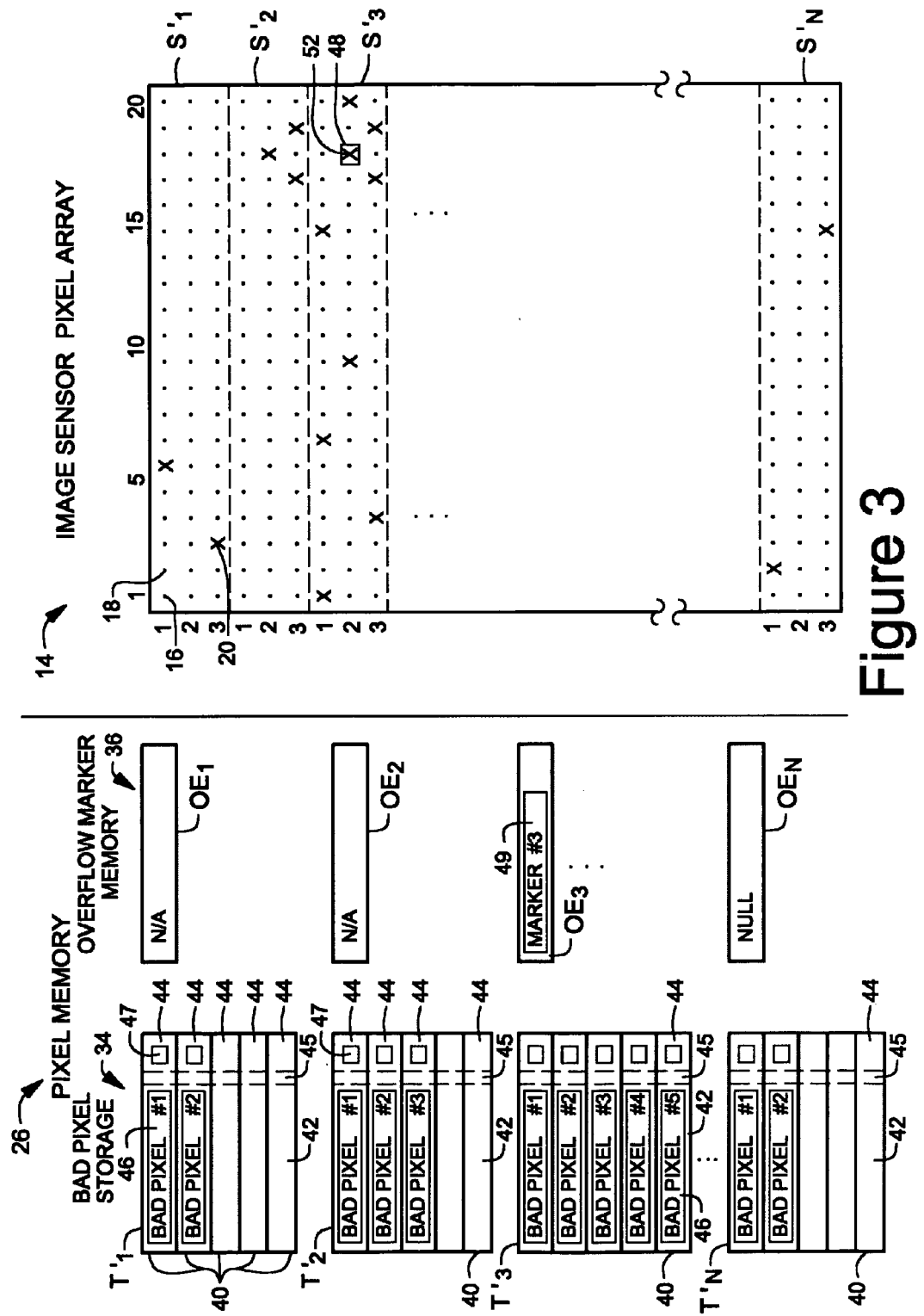
FIG. 3 is a representation of another embodiment of an image sensor pixel array and an associated pixel memory for use in the imaging system shown in FIG. 1.

FIG. 3 is a representation of another embodiment of an image sensor pixel array (14) and an associated pixel memory (26) for use in the imaging system (10) shown in FIG. 1. The same reference numerals have been used to identify like elements from FIG. 2. The image sensor pixel array (14) is divided into sections ($S'_{1-N}$). Each section includes a plurality of rows and all of the columns in the image sensor pixel array (14). Again, the sections (S') do not necessarily need to be identically sized, but for convenience and ease of implementation, the sections are shown identically sized. In one embodiment, one section may encompass all the rows and columns of the image sensor pixel array. For convenience, the rows and columns of each section S' have been sequentially numbered beginning with one. As one skilled in the art will appreciate, for identically sized sections, the section $S'_N$ that includes the last row, row N, may have a different number of rows than other sections S' if the number of rows is not evenly divisible. The tables $T'_{1-N}$ are illustrated having five entries 40. Although each table (T') is shown having five entries (40), any number of entries (40) and any appropriate storage technique may be used without departing from the scope of the present invention.

In other embodiments of the pixel memory (26), the tables T in pixel memory 26 may not have a one to one correspondence with sections S' in the image sensor array (14). For example, one table (T) may store the bad pixel identifiers (46) for multiple sections. In these embodiments, location identifier (42) may further include a section identifier (45).

Figure 4:
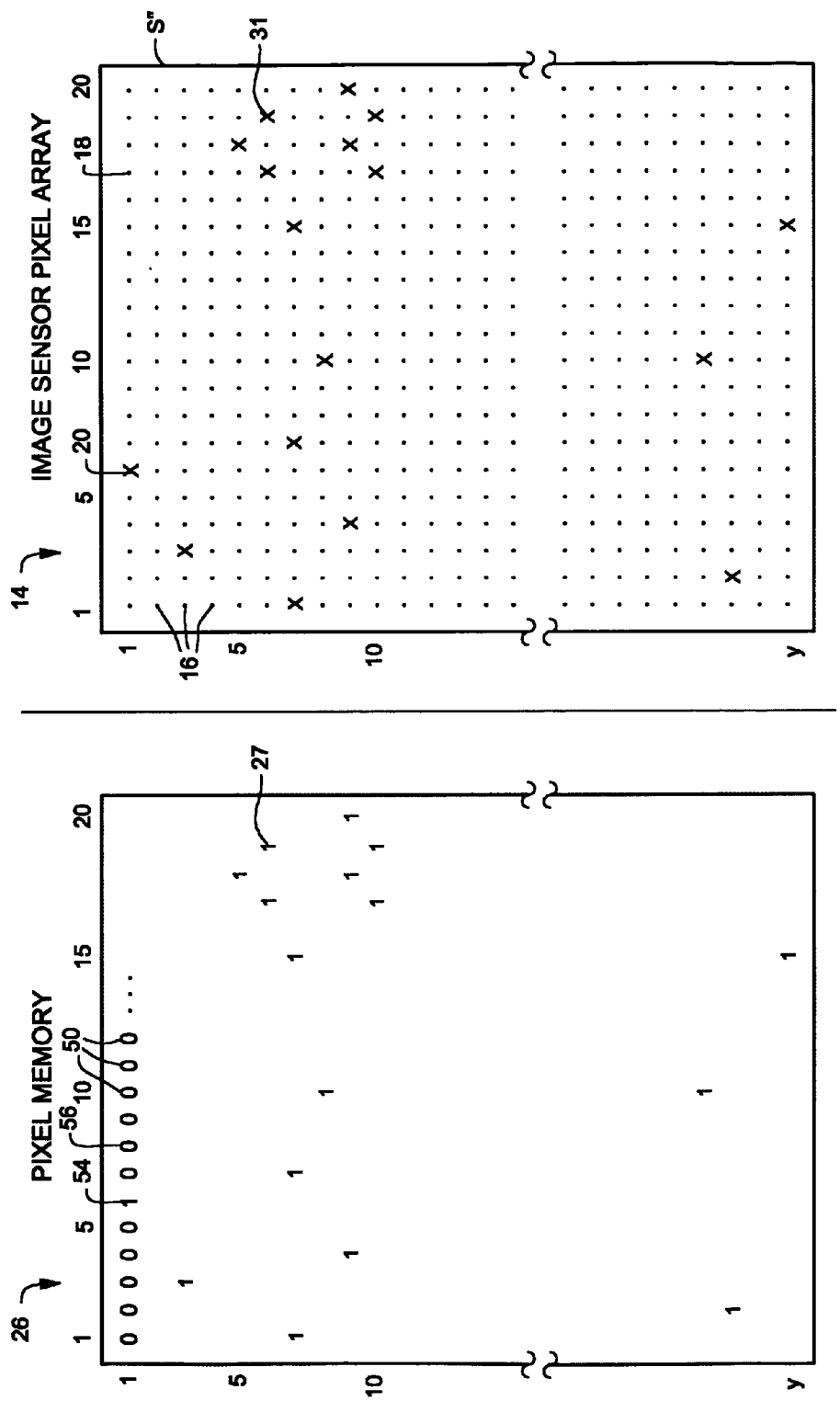
FIG. 4 is a representation of yet another embodiment of an image sensor pixel array and an associated pixel memory for use in the imaging system shown in FIG. 1.

FIG. 4 is a representation of yet another embodiment of an image sensor pixel array (14) and an associated pixel memory (26) for use in the imaging system (10) shown in FIG. 1. In this embodiment, the pixel memory (26) includes a plurality of bits (50). Each bit (50) is associated with one of the plurality of pixels (16) in the image sensor pixel array (14). Again, the good pixels (18) are represented with a dot and the bad pixels (20) are represented with an "X" in the image sensor pixel array (14). The bits (50) of the pixel memory (26) include set pixels (54, represented with a "1" in FIG. 4) or clear pixels (56, represented with a "0" in FIG. 4). In this embodiment, set pixels 54 are associated with a bad pixel (20) and clear pixels 56 are associated with a good pixel or untested pixel (18). For convenience and clearer representation, only a portion of the pixel memory (26) is illustrated with "0" for clear pixels 56. Although FIG. 4 only shows a single bit associated with each pixel, those skilled in the art will appreciate that the pixel memory (26) could be configured to have more than one bit associated with each pixel 16 in the image sensor pixel array 14. As will be described in detail below, the extra bit associated with each pixel may be used as a confidence indicator. The confidence indicator may be used to provide logic 29 a method of specifying whether the pixel (16) associated with the extra bit is more or less likely to be a good pixel or a bad pixel. For the purposes of the following discussion, the image sensor pixel array 14 is represented by one section S", rather than multiple sections.

The embodiments for the pixel memory 26 illustrated in FIGS. 2–4 have individual trade-offs when implemented in the present invention. For example, the tables used in FIGS. 2 and 3 require much less memory than the bitmap illustrated in FIG. 4. However, when using tables, the present invention will likely experience memory overflow conditions that will reduce the speed of convergence for the imaging system. The bitmap will not have a memory overflow condition.

Figure 5:
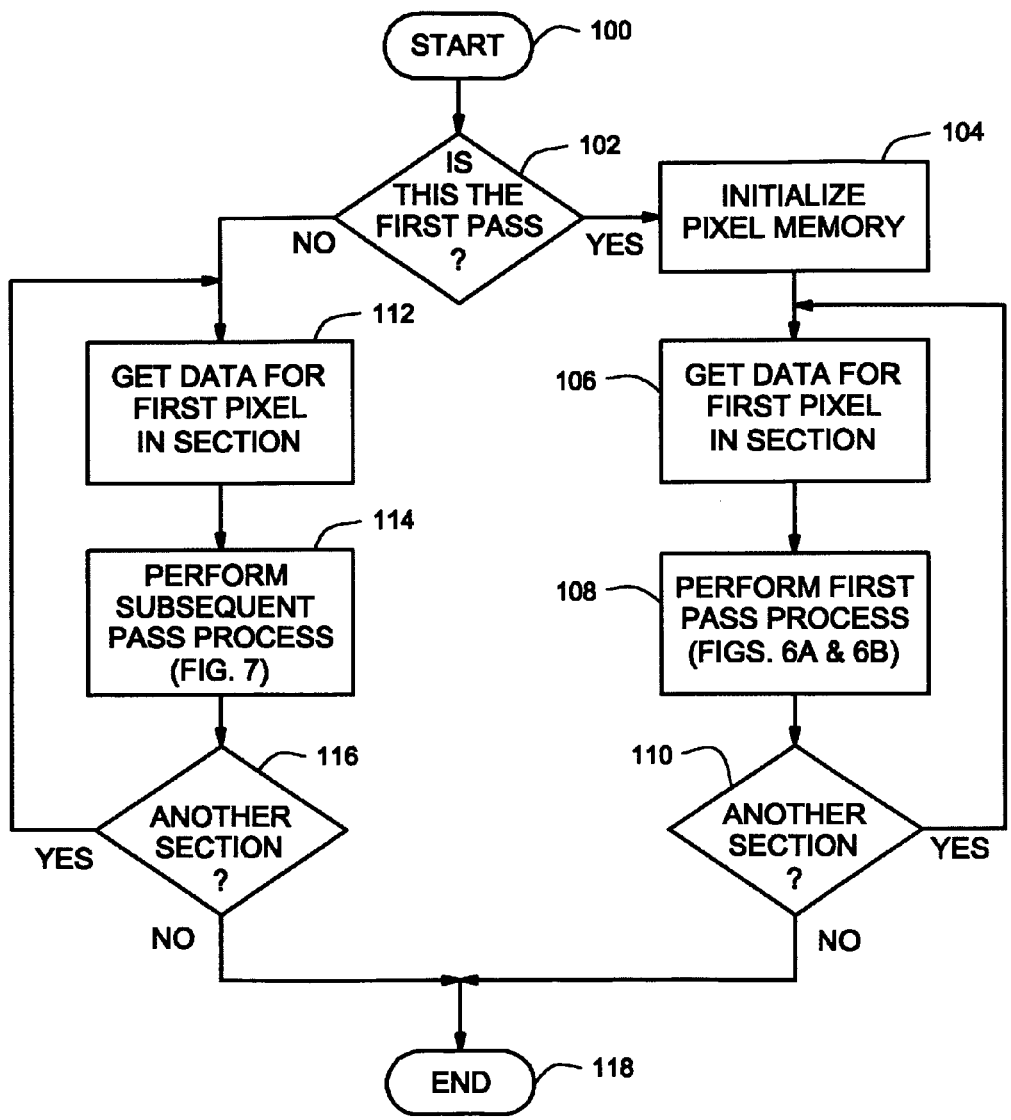
FIG. 5 is a flow chart illustrating an overview of one embodiment of the operational flow for the imaging system shown in FIG. 1.

FIG. 5 is a flow chart illustrating an overview of one embodiment of the operational flow of logic operations 28 and processor 12 shown in FIG. 1 for handling bad pixels 20 in image sensor pixel array 14 in accordance with the present invention. The image sensor pixel array (14), logic operations 28 and processor 12 are all part of an imaging system (10). The process begins at block 100, where the processor (12) shown in FIG. 1 is ready to process an image of an object sensed by the image sensor pixel array, and proceeds to decision block 102. The data values representing the image may be either captured directly from the image sensor pixel array or received from another source such as a memory, or stream of data from another process.

At decision block 102, the logic 29 determines whether processing of the image is a first pass for the imaging system. A first pass may occur when the imaging system is powered on or when the imaging system is reset. The imaging system may be reset by any conventional manner, such as a reset button on a digital camera. A reset condition may also be accomplished in logic 29 by design such as, for example, a physical or software timer that periodically initiates a reset. If the logic determines that it is the first pass, the process proceeds to block 104.

At block 104, the pixel memory is initialized. For the embodiments illustrated in FIGS. 2–4, initialization may include setting the pixel memory to a known state, such as clearing the pixel memory to contain zeroes. Once initialization is complete, the process proceeds to block 106. At block 106, the logic gets a data value associated with a first pixel in a section, and then proceeds to block 108.

At block 108, a first pass process is performed. The first pass process, illustrated in FIGS. 6A and 6B and described in detail below, determines which pixels are bad and stores an identifier for the bad pixels in the pixel memory. Once the first pass process is completed for one of the sections of the image sensor pixel array, the process proceeds to decision block 110. The first pass process may have multiple sections in order to reduce the likelihood of a memory overflow condition caused by a bright spot. Typically, all the pixels in the bright spot would be classified as "possibly bad" in the pixel memory. Thus, if the bright spot is near the top of an image, the bad pixels located in the lower portion of the image will not get classified. This results in slower convergence for the correctly processing the entire image. However, by using sections, the pixels in the bright spot will only be able to consume a portion of the overall pixel memory. The remaining portion may be used for classifying bad pixels in other sections.

At decision block 110, a determination is made whether another section of the image sensor pixel array is available for processing. If another section is to be processed, the process loops back to blocks 106 and 108 to process the pixels in the next section as described above. As mentioned above, the image sensor pixel array may be divided into any number of sections or may have just one section. Once the determination at decision block 110 concludes that no sections remain for performing the first pass, the process proceeds to end 118. The process will then wait for processing of subsequent images.

Now, returning back to decision block 102, if the determination concludes that it is not the first pass, the process proceeds to block 112. At block 112, the logic gets a data value associated with a first pixel in a section, and proceeds to block 114. In one embodiment, the first pixel of the first section is processed the first time we proceed to block 112. In another embodiment, the first pixel of another predetermined section (not necessarily the first section) is processed first.

At block 114, a subsequent pass is performed. The subsequent pass, illustrated in FIGS. 7 and 8 and described in detail below, determines which pixels are identified as bad pixels in the pixel memory and determines whether the pixel should remain identified as bad in the pixel memory. Once the subsequent pass process is completed for one of the sections of the image sensor pixel array, the process proceeds to decision block 116.

At decision block 116, a determination is made whether another section of the image sensor pixel array is available for processing. If there is, the process loops back to blocks 112–114 to process the pixels as described above. Once the determination at decision block 116 concludes that no sections remain for performing the subsequent pass process, the process proceeds to end 118.

Figure 6A:
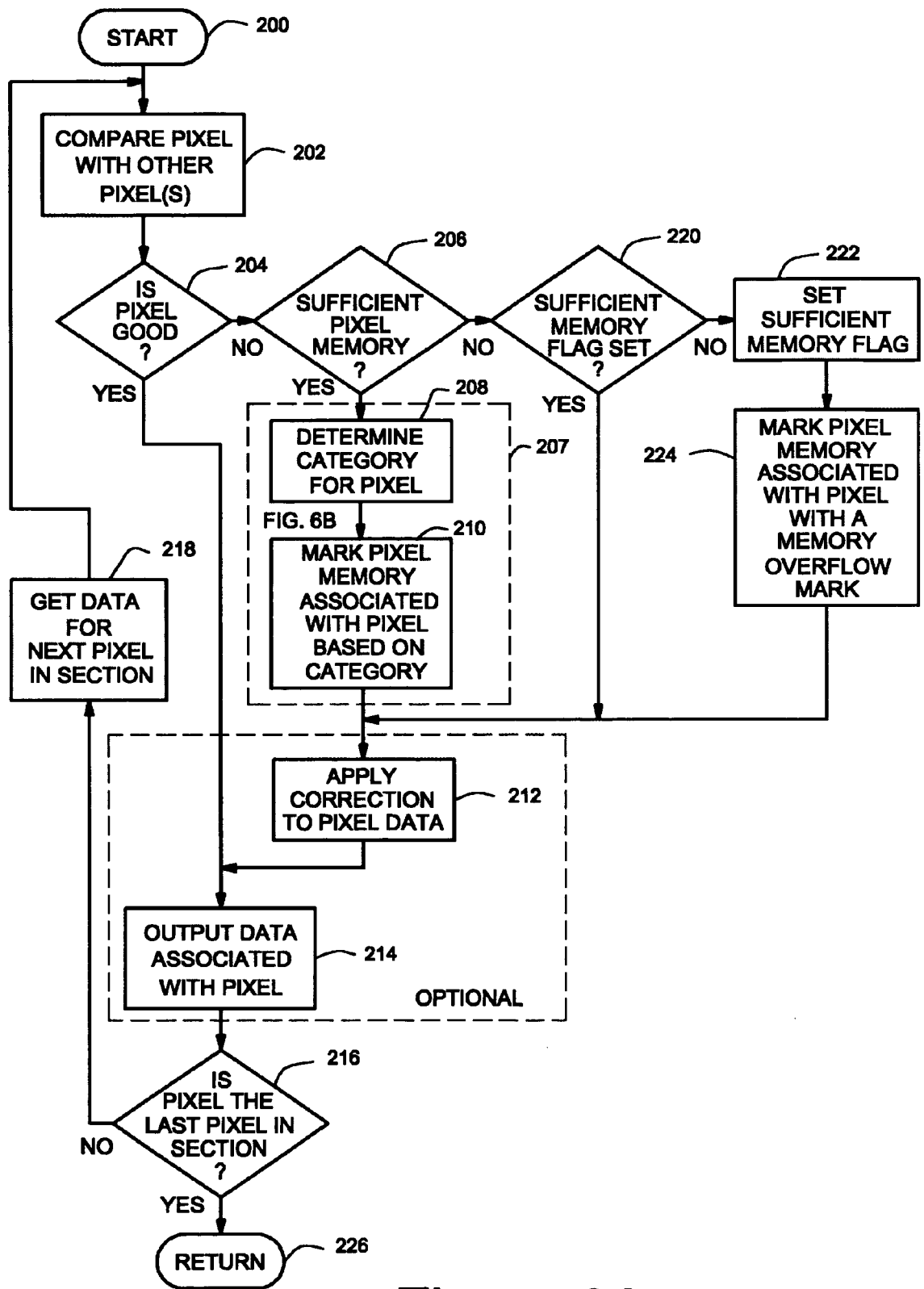
FIGS. 6A and 6B are flow charts illustrating one embodiment of a first pass process suitable for use in FIG. 5.
Figure 6B:
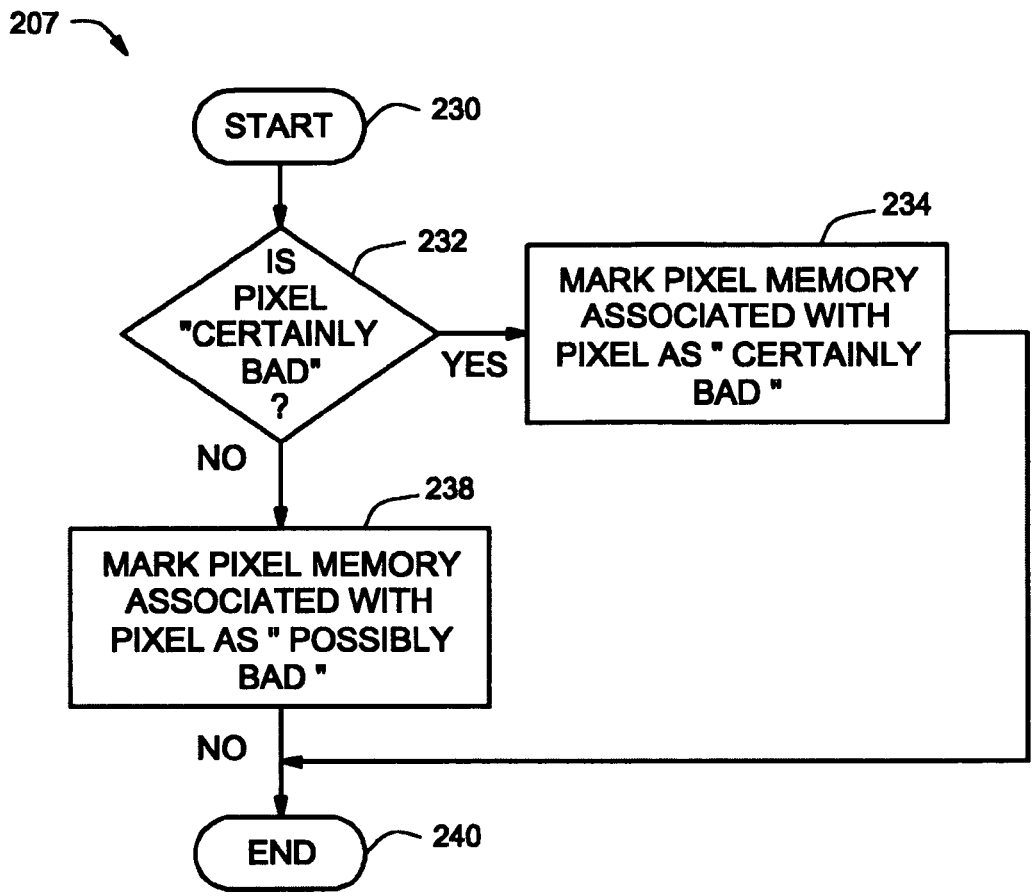

FIGS. 6A and 6B are flow charts illustrating one embodiment of the first pass process suitable for use in block 108 of FIG. 5. The first pass begins at block 200, where the data value associated with the first pixel of the section is available and an insufficient memory flag is initialized to a first known state so that processing described below may use the insufficient memory flag. The process then proceeds to block 202. For instances where the image sensor pixel array and associated memory is organized as a single section, only one insufficient memory flag may exist. For instances where the image sensor pixel array and associated memory is organized as multiple sections, a separate insufficient memory flag may exist for each section.

At block 202, the data value associated with the first pixel is compared with data values of other pixels in the image sensor pixel array. In one embodiment, the other pixels are neighboring pixels, such as pixels that are immediately to the left or right of the pixel being processed. In another embodiment, the other pixels may further include pixels immediately above or below the pixel being processed. For this embodiment, additional memory is needed to store data values from previous lines. When processing pixels on the edge of the image sensor pixel array, the other pixels may include only one pixel, such as a right neighboring pixel for a left edge pixel. After the comparison, the process proceeds to decision block 204.

At decision block 204, a determination is made whether the comparison in block 202 indicated that the pixel is a "good" pixel. The comparison may use any of a number of criteria. For example, the following is an illustrative criterion:

$$(P_n < P_{n-1} + T_g) \&\& (P_n < P_{n+1} + T_g), \quad (1)$$

Where, $P_n$=data value for a certain pixel;

$P_{n-1}$=data value for a neighboring pixel processed prior to $P_n$;

$P_{n+1}$=data value for a neighboring pixel processed after $P_n$; and $T_g$=a threshold for identifying good pixels.

Using this criterion, the logic will determine that the pixel is "good" if its associated data value is within a tolerance ($T_g$) of the data values of neighboring pixels, such as pixels to the left or right of $P_n$. If the data value is determined to be "good", the process optionally proceeds to block 214 where the data value is output. One skilled in the art will recognize that the data value does not necessarily need to be output at this time, but could be stored for later output or further processing without departing from the scope of the present invention. From block 214, the process proceeds to decision block 216.

At decision block 216, the data value associated with a next pixel in the section is retrieved. The next pixel may be determined using any conventional scanning pattern or other pattern, such as right to left scanning, zigzag scanning, and vertical scanning. After getting the data value for the next pixel, the process loops back to block 202 and continues processing as described above.

Returning to decision block 204, if the logic determines that the pixel is not good (i.e., a bad pixel), processing proceeds to decision block 206. At decision block 206, a determination is made whether there is sufficient pixel memory 26 for storing information about the bad pixel. In the embodiments illustrated in FIGS. 2 and 3, the determination is based on whether there is another entry (40) available in the table (T) associated with the current section (S) being processed. If there is sufficient pixel memory available, the process proceeds to block 207, graphically represented as including blocks 208 and 210.

In one embodiment mentioned above, one table T stores the bad pixel information for multiple sections. Once the logic determines that there is insufficient pixel memory for any of the sections at decision block 206, there will be insufficient pixel memory for any subsequent sections.

In general, at block 207, the logic determines a category in which the bad pixel should be classified, and then marks the pixel memory (26) associated with the bad pixel accordingly. In the embodiments illustrated in FIGS. 2 and 3, the logic performed in block 207 may classify the bad pixel into several categories by storing a category indicator (47) in the status field (44).

In the embodiment illustrated in FIG. 4, there are only two categories for pixels (i.e., good or bad). The bad pixels are indicated as bad in the pixel memory 26 by setting a bit in the pixel memory 26 that corresponds to the bad pixel in the image sensor pixel array. A representative pairing, shown in FIG. 4, has bit 27 in the pixel memory being set. Bit 27 corresponds to bad pixel 31 in image sensor pixel array 14. As mentioned above, if the pixel memory had more than one bit corresponding to each pixel in the image sensor pixel array, the extra bit(s) may be used to classify the bad pixel into various categories indicating the probability that the bad pixel is really "bad".

FIG. 6B illustrates one embodiment for block 207 suitable for use in FIG. 6A. The classification begins at block 230, where the pixel has already been classified as not "good", and proceeds to block 232. At block 232, a determination is made whether the not "good" pixel is "certainly bad". This determination may use any of a number of criteria. For example, the following is an illustrative criterion:

$$(P_n > P_{n-1} + T_{cb}) \&\& (P_n > P_{n+1} + T_{cb}), \quad (2)$$

Where, $P_n$=data value for a certain pixel;

$P_{n-1}$=data value for a neighboring pixel processed prior to $P_n$;

$P_{n+1}$=data value for a neighboring pixel processed after $P_n$; and $T_{cb}$=a threshold for "certainly bad" pixels.

Using the above criterion, the logic will determine that the pixel is "certainly bad" if the pixel's associated data value is within a tolerance ($T_{cb}$) of the data values of neighboring pixels, such as pixels to the left or right of $P_n$. If the data value is determined to be "certainly bad", the process proceeds to block 234 where the pixel memory associated with the pixel is marked as "certainly bad". Although the above criteria have two classification levels for pixel confidence, "certainly bad" and "possibly bad", any number of classification levels may be used.

In the embodiments illustrated in FIGS. 2 and 3, the process of marking the pixel memory (i.e., block 234) includes storing a location identifier for the pixel as an entry (40) in a table (T) associated with the section of the image sensor pixel array (14). A category identifier (47), such as "certainly bad", is stored in the status field (44) of entry 40 in table T. In the embodiment illustrated in FIG. 4, the process of marking the pixel memory (i.e., block 234) may include setting a bit corresponding to the pixel in the bit map. The process then proceeds to the end 240, which completes the processing performed in block 207 of FIG. 6A.

Before returning to FIG. 6A, if the determination in decision block 232 is that the pixel is not "certainly bad", then the pixel is "possibly bad" and the process proceeds to block 238. At block 238, the pixel memory associated with the pixel is marked as "possibly bad". The process for marking the pixel memory is the same as described above, except for using a different category identifier 47. The process then proceeds to end 240, which completes the processing performed in block 207 of FIG. 6A.

Returning to FIG. 6A, after the processing within block 207 is completed, processing may optionally proceed to blocks 212 and 214. At block 212, a correction is applied to the data value associated with the pixel. Typically, the correction includes interpolating a correct data value based on the data values of neighboring pixels to the pixel. The corrected data value associated with the pixel is then optionally output at block 214. As mentioned earlier, applying the correction and outputting the data value may be performed at a later time or after further processing has been performed. Thus, blocks 212 and 214 are illustrated as optional blocks and are provided to illustrate how the handling of bad pixels in accordance with the present invention may be used in an imaging system. From block 214, the process proceeds to decision block 216 and proceeds as described above.

Returning back to decision block 206, if the logic concludes that there is not sufficient pixel memory (i.e. memory overrun/overflow), the process proceeds to decision block 220. At decision block 220, a determination is made whether the insufficient memory flag is set or whether some other type of indicator is marked that indicates that a prior determination of insufficient pixel memory has been performed. Assuming this is the first determination of insufficient memory, the logic proceeds to block 222.

At block 222, the processor and logic set the insufficient memory flag and proceeds to block 224 where an overflow identifier (49) is stored in the associated overflow entry OE (see FIGS. 2 and 3). Briefly, the overflow identifier (49) specifies a location for the pixel at which the first pass processing resumes once some of the bad pixel locations stored in the associated table (T) have been removed during the subsequent pass process illustrated in FIGS. 7 and 8 and described in detail below. After block 224 completes, the process optionally proceeds to blocks 212 and 214 as described above.

If, at decision block 220, the processor and logic determine that the insufficient memory flag is set, indicating that an overflow identifier has previously been stored in the associated overflow entry OE, the process optionally proceeds to blocks 212 and 214 as explained above.

As one skilled in the art will appreciate, the first pass may follow various flows for determining into which category a pixel is classified. For example, instead of determining whether a pixel is good at block 204, the first pass may first determine whether the pixel is "certainly bad" and take the appropriate action. If the pixel is not "certainly bad," the first pass may then determine whether the pixel is "possibly bad" and take the appropriate action. Using this flow with the proper criteria, the first pass may not necessary explicitly determine whether a pixel is "good". The pixel is implicitly assumed to be "good" if the pixel does not meet either the "certainly bad" or "possibly bad" criteria. Other flows may also result in the same outcome. Thus, the flow illustrated in FIG. 6A represents one embodiment for classifying pixels.

Figure 7:
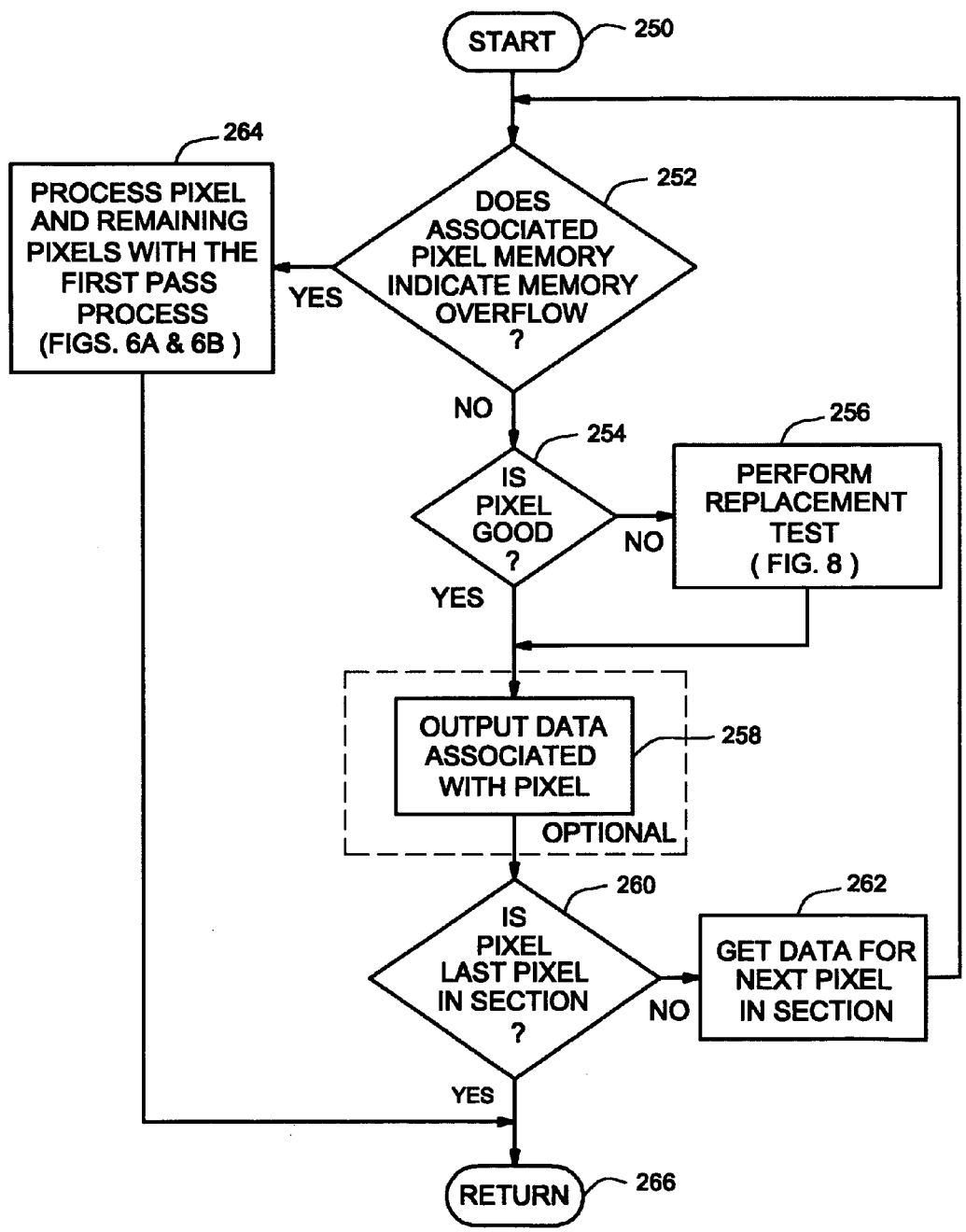
FIG. 7 is a flow chart illustrating one embodiment of a subsequent pass process suitable for use in FIG. 5.

FIG. 7 is a flow chart illustrating one embodiment of a subsequent pass process suitable for use in FIG. 5. The subsequent pass begins at block 250, where the data value associated with the first pixel of the section is available, and proceeds to decision block 252. At decision block 252, a determination is made whether the pixel memory indicates a memory overflow (overrun) condition. As discussed above, the memory overflow condition may be checked by reading the overflow identifier (49) stored in the overflow marker memory (36) associated with the section in which the pixel resides and determining whether the overflow identifier (49) identifies the location of the pixel. If the overflow identifier (49) identifies the location of the pixel, the process proceeds to block 264.

At block 264, the pixel and the remaining pixels in the section are processed using the first pass process illustrated in FIGS. 6A and 6B and described in the related discussions. The overflow entry (OE) associated with the section will contain the location of the pixel at which the first pass process should resume. However, the first pass process will only add another bad pixel to the pixel memory after at least one entry has been removed from the table in accordance with the replacement test illustrated in FIG. 8 and discussed in detail below. Once the first pass process is completed, the process proceeds to return 266 to continue processing of other sections or other new images as illustrated in FIG. 5.

Now, returning back to decision block 252, if the pixel memory does not indicate a memory overflow condition, processing proceeds to decision block 254. At decision block 254, a determination is made whether the data value associated with the pixel is "good". The determination is based on information stored in the pixel memory associated with the pixel. Thus, using history to determine which pixels should most likely be corrected. If the data value of the pixel is determined to be "good", processing optionally proceeds to block 258 where the data value associated with the pixel is output. Again, this block is optional because the data value may be stored for later outputting or for additional processing. The process then proceeds to decision block 260.

At decision block 260, a determination is made whether the pixel is the last pixel in the section. If the pixel is the last pixel in the section, the process proceeds to return block 266 to continue processing of other sections or other new images as illustrated in FIG. 5. If the current pixel is not the last pixel in the section, the process proceeds to block 262 where a data value associated with a next pixel in the section is retrieved. Processing then proceeds back to decision block 252, where processing continues as described above.

Returning back to decision block 254, if the data value associated with the pixel is determined to be not "good", processing proceeds to block 256 where a replacement test is performed. Briefly, the replacement test, illustrated in FIG. 8 and described in detail below, performs additional tests on any pixel that is marked not "good" and determines whether the earlier determination was incorrect. If the earlier determination was incorrect, the category identifier stored in the pixel memory for the pixel is modified.

In one embodiment, illustrated in FIG. 4, the pixel is re-categorized by clearing the pixel memory associated with the pixel (i.e., re-categorizing the bad pixel as a good pixel). In other embodiments, illustrated in FIGS. 2 and 3, the pixel is re-categorized by removing the entry (40) associated with the pixel from the associated table (T) or by modifying the entry (40) associated with the pixel in the associated table (T). After the replacement test completes, processing proceeds to decision block 260, either directly or through block 258, and proceeds as described above.

Figure 8:
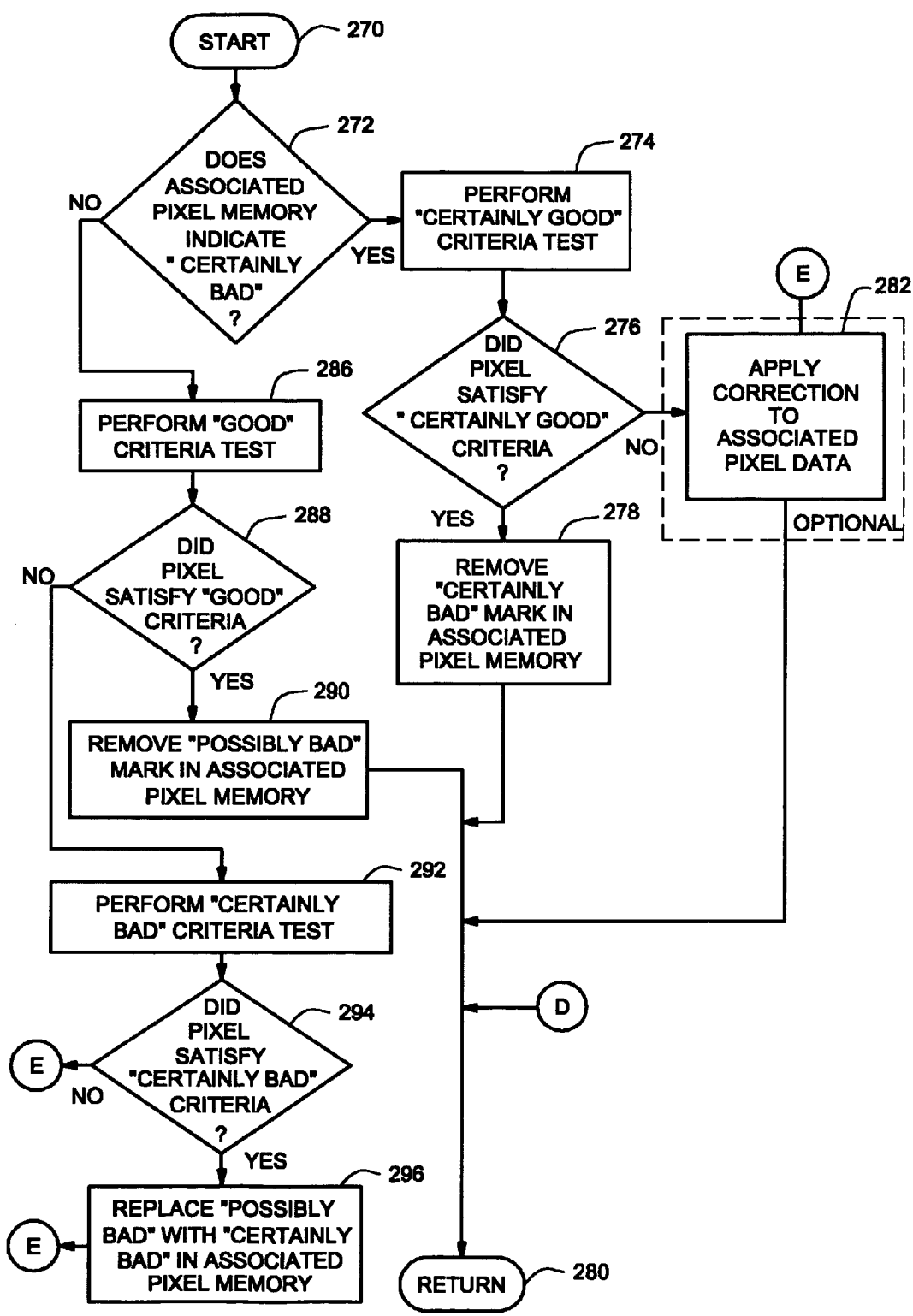
FIG. 8 is a flow chart illustrating one embodiment of a replacement test suitable for use in FIG. 7.

FIG. 8 is a flow chart illustrating one embodiment of the replacement test suitable for use in FIG. 7. The replacement test begins at block 270, and proceeds to decision block 272. At decision block 272, a determination is made whether the pixel memory associated with the pixel indicates that the pixel is "certainly bad". If the pixel is "certainly bad", the process proceeds to block 274.

At block 274, the logic performs a "certainly good" criteria test on the data value associated with the pixel. The criteria for this test may be one of several forms. The following is an illustrative criterion:

$$(P_n<P_{n-2}+T_{cg}) \&\& (P_n<P_{n-1}+T_{cg}) \&\& (P_n<P_{n+1}+T_{cg}) \&\& (P_n<P_{n+2}+T_{cg}), \tag{3}$$

Where, $P_n$=data value for a certain pixel;

$P_{n-1}$=data value for a neighboring pixel processed prior to $P_n$;

$P_{n-2}$=data value for a neighboring pixel processed prior to $P_{n-1}$;

$P_{n+1}$=data value for a neighboring pixel processed after $P_n$;

$P_{n+2}$=data value for a neighboring pixel processed after $P_{n+1}$; and $T_{cg}$=a threshold for "certainly good" pixels.

As one will note, the "certainly good" criteria is more stringent than the "good" criteria by including not only the nearest neighbors, but also neighbors that are farther from the original pixel ($P_n$). Using the above criterion, the logic will determine that the pixel is "certainly good" if the pixel's associated data value is within a tolerance ($T_{cg}$) of the data values of neighboring pixels, such as pixels one or more locations to the left or right of $P_n$ or pixels above or below the pixel. After applying the "certainly good" criteria to the pixel, the process proceeds to decision block 276.

At decision block 276, a determination is made whether the data value satisfied the "certainly good" criteria. If the data value is "certainly good", the process proceeds to block 278 where the logic removes the "certainly bad" indicator in the pixel memory associated with the pixel. In the embodiments illustrated in FIGS. 2 and 3, the "certainly bad" indicator is removed by removing an entry (40) from a table (T) associated with the pixel in the section. In the embodiment illustrated in FIG. 4, the "certainly bad" indicator is removed by clearing the pixel memory associated with the pixel. The process then proceeds to a return 280 to continue the processing illustrated in FIG. 7.

Returning to decision block 276, if the data value associated with the pixel is determined not to meet the "certainly good" criteria, the process proceeds directly to return 280 or indirectly to return 280 through block 282. At block 282, a correction is applied to the data value associated with the pixel. Again, as described above, the correction interpolates a corrected data value for the associated pixel based on the data values of neighboring pixels.

Returning to decision block 272, where the determination is made whether the pixel memory associated with the pixel indicates that the pixel is "certainly bad". When the pixel is indicated to be "certainly bad", the process proceeds to block 286 because the pixel is "possibly bad." At block 286, the logic performs a "good criteria" test on the data value associated with the pixel. Two illustrative examples of the "good criteria" test are shown in equations 1 and 3 above. After performing the test in block 286, the process proceeds to decision block 288. At decision block 288, a determination is made whether the data value associated with the pixel satisfied the "good criteria" test. If the pixel satisfies the "good criteria" test, the process proceeds to block 290 where the logic removes the "possibly bad" indicator in the pixel memory associated with the pixel, and proceeds to the return 280 to continue processing illustrated in FIG. 7. As described above, the embodiments illustrated in FIGS. 2 and 3 remove the "possibly bad" indicator by deleting the entry (40) associated with the pixel from the table (T).

If, however, at decision block 288, the logic determines that the data value associated with the pixel did not satisfy the "good criteria", the process proceeds to block 292. At block 292, the logic performs a "certainly bad" criteria test on the data value associated with the pixel. The criteria for this test may be one of several forms. An illustrative example is shown in equation 2 and described above. After applying the "certainly bad" criteria on the data value, the process proceeds to decision block 294.

At decision block 294, a determination is made whether the data value associated with the pixel satisfies the "certainly bad" criteria. If the "certainly bad criteria" is satisfied, the process proceeds to block 296 where the logic replaces the "possibly bad" indicator in the pixel memory associated with the pixel with a "certainly bad" indicator. In the embodiments illustrated in FIGS. 3 and 4, setting the pixel to "certainly bad" is achieved by storing the "certainly bad" indicator in the status field (44) of the entry (40) in the table (T) associated with the pixel. The process then proceeds directly to the return 280 or indirectly to the return 280 through block 282 as described above.

Returning to decision block 294, if the data value associated with the pixel is determined not to meet the "certainly bad" criteria, the process proceeds directly to the return 280 or indirectly to return 280 through block 282 as described above.

Therefore, in general, the replacement test illustrated in FIG. 8 performs additional tests on any pixel that is determined not to be "good" and determines the best categorization for that pixel. One will note that once a pixel is categorized as "good", additional testing is not performed on that particular pixel. Thus, the various criteria described above should be stringent enough so that an actual "bad" pixel does not erroneously get categorized as "good". In addition, thresholds for each of the above criteria (e.g., $T_g$, $T_{cb}$, $T_{pb}$, $T_s$, and $T_{cg}$) may be adjustable by processor 12. In one embodiment, processor 12 may write a new value in a programmable register associated with one of the thresholds. Logic 29 may then use the new value when evaluating the above criteria. Adjusting thresholds during operation allows greater flexibility for operating in varying conditions.

Figure 9:
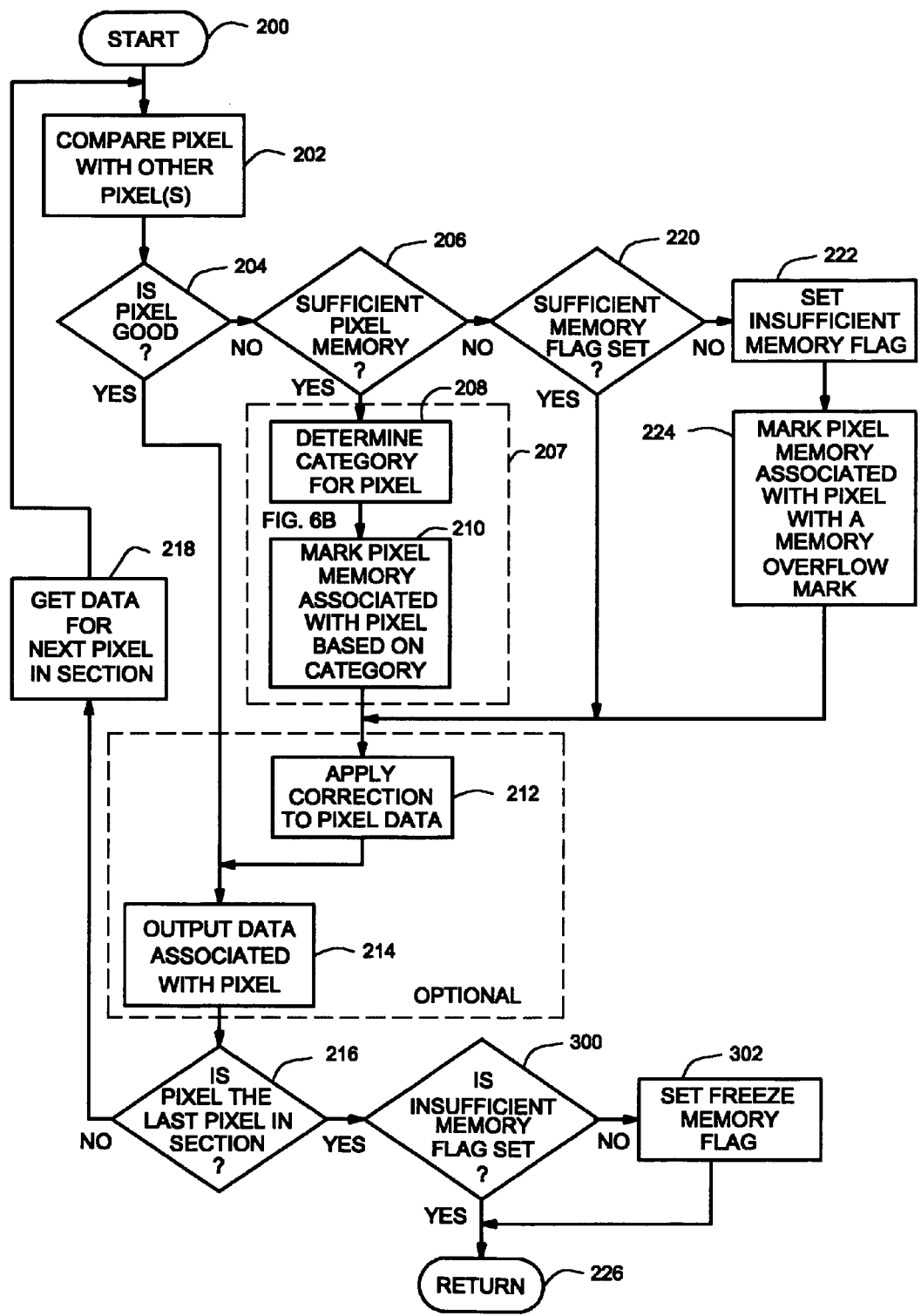
FIG. 9 is a flow chart illustrating another embodiment of a first pass process that includes a freeze memory feature suitable for use in FIG. 5.
Figure 10:
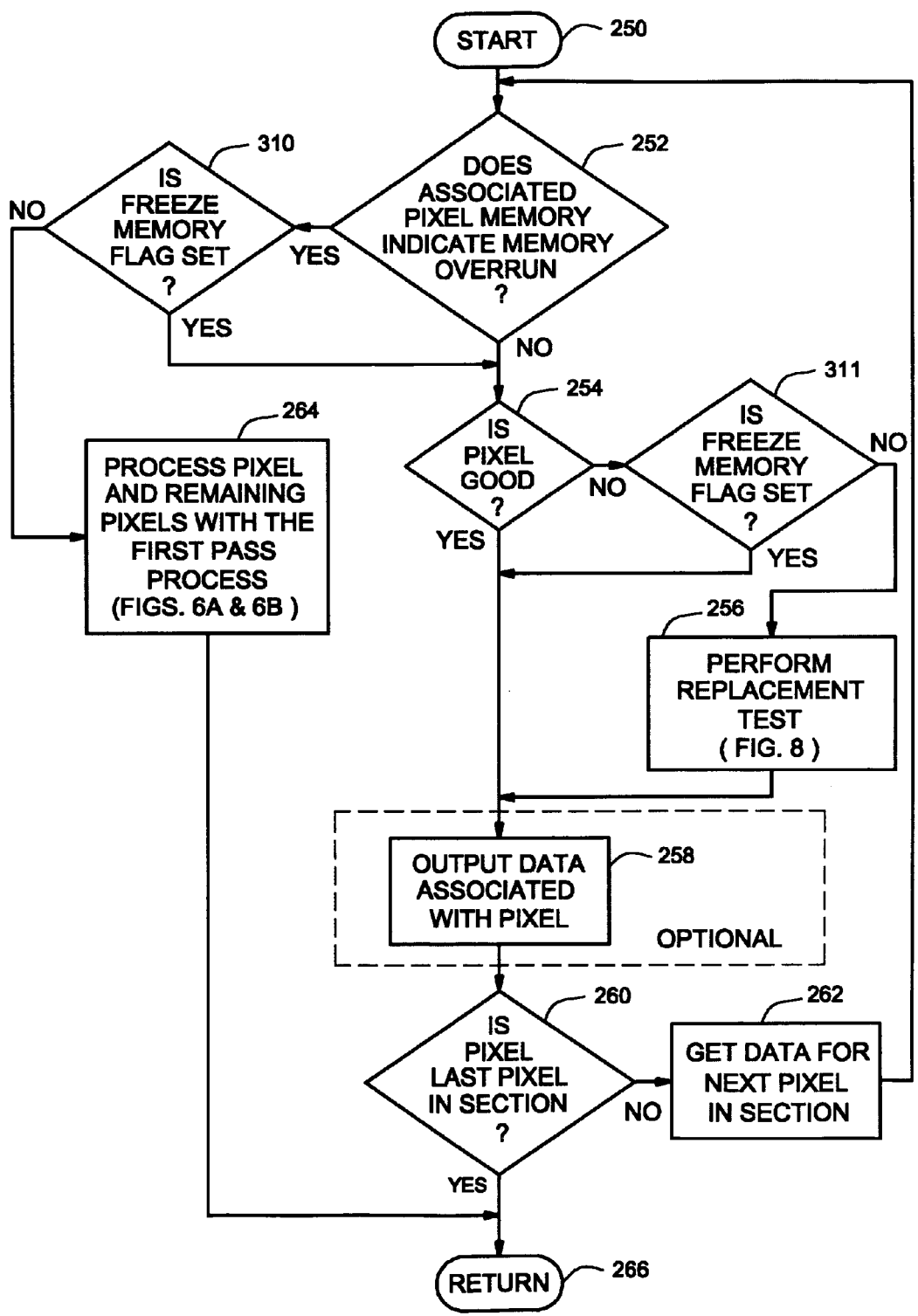
FIG. 10 is a flow chart illustrating another embodiment of a subsequent pass process that includes a freeze memory feature suitable for use in FIG. 5, in accordance with the present invention.

FIGS. 9 and 10 are flow charts illustrating another embodiment of a first pass process and a subsequent pass process that includes a freeze memory feature, also suitable for use in FIG. 5. Like reference numerals as FIGS. 6A and 7 are used for like processing blocks and will not be discussed with respect to FIGS. 9 and 10, respectively. Additional processing blocks 300–302 are added to FIG. 9 and processing block 310 is added to FIG. 10 to illustrate the freeze memory feature.

In one embodiment, the freezing memory feature is used to avoid erroneously removing a bad pixel once the entire image or an individual section of the image has completed the first pass. In other embodiments, the freezing memory feature may be used to detect and modify bad pixels once after every certain number of passes, such as when the image sensor array is not exposed to significant changes in an object (e.g., image sensor array in use for a surveillance camera).

Referring to FIG. 9, the first pass process having the freeze memory feature begins at block 200. At block 200 the data value for the first pixel of the section is available, and processing proceeds as described with reference to FIG. 6A until decision block 216. At decision block 216, the logic determines whether the current pixel is the last pixel in the section. If the current pixel is the last pixel in the section, the process proceeds to blocks 300–302 instead of proceeding directly to the return 226 as in FIG. 6A.

At decision block 300, a determination is made whether an insufficient memory flag is set. This insufficient memory flag may be the same indicator described above. For example, in the embodiments illustrated in FIGS. 2 and 3, the determination in decision block 300 may involve reading the overflow memory entry (36) associated with the section in which the pixel resides and determining whether there is a valid overflow identifier (49) stored therein. If the insufficient memory flag is set, processing proceeds to the return 226 because the first pass processing for this section has not completed. The first pass processing for this section will complete after additional memory becomes available during processing in subsequent passes as described above with reference to FIGS. 7 and 8. However, if a determination is made that the insufficient memory flag is not set (i.e., all first pass processing for the section has completed), the process proceeds to block 302.

At block 302, the freeze memory option is selected for the current section. This may be accomplished by using a flag for each section or a global flag such that only after all the sections have completed will the freeze memory flag be selected. In either case, after the freeze memory flag is selected, the process proceeds to return 226 as described above.

Now, referring to FIG. 10, the subsequent pass having the freeze memory feature begins at block 250 and proceeds to decision block 310. At decision block 310, a determination is made whether the freeze memory flag option is selected. If so (i.e., all first pass processing for that section is complete), the process proceeds directly to decision block 260 or indirectly through optional block 258 as described in FIG. 7. One should note that the output data associated with the pixel at block 258 may be either the data value or the corrected data value. Thus, "freezing" the category identifiers in the pixel memory for any pixel detected as not "good". Otherwise, the process proceeds to decision block 252 and proceeds as described above for FIG. 7.

In an alternate embodiment in which the freezing memory feature is used to detect and modify bad pixels, once after every certain number of passes, the first pass illustrated in FIGS. 6A and 6B is performed and the subsequent pass illustrated in FIG. 10 is performed. At decision block 310 in FIG. 10, the determination of whether the freeze memory option is selected is based on whether a pre-determined number of passes have been performed. If the requisite number of passes have been performed, the process proceeds to block 252 and proceeds as described above in reference to FIG. 7. Otherwise, the process proceeds directly to decision block 260 or indirectly through optional block 258 as described in FIG. 7 above.

While the logic illustrated in FIGS. 6A, 6B, 7 and 8 tests for three categories, one skilled in the art will recognize that any number categories may be used without departing from the scope of the present invention. Having at least two categories for bad pixels allows varying criteria to be used for determining whether the bad pixel is actually a good pixel. If only one criterion was used, the criterion would have to be stringent enough so that bad pixels would not erroneously get classified as a good pixel. However, having a stringent criterion may result in a memory overrun situation in which most of the memory is storing information about pixels that are not really bad. Thus, actual bad pixels occurring after the memory overrun will not be corrected. This reduces the speed of convergence. In addition, by using history stored in the pixel memory, good pixels will not be erroneously corrected when the good pixels are in a bright spot.

Another benefit of the present invention is that the imaging system may be started in a dark environment, such as when the lens cap on a digital camera remains on during the first pass. This allows the imaging system to converge to a stable state very rapidly because pixels will not erroneously be categorized as bad for being in a bright spot (i.e., there will be no bright spot). In addition, the imaging system will not erroneously categorize edge pixels as bad pixels. Because pixels will not be erroneously categorized as bad pixels, sufficient pixel memory will most likely be available to store locations of the pixels that are actually bad pixels. Thus, the imaging system will converge quickly and accurately.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for using an image sensor array having one or more bad pixels out of a plurality of pixels, the method comprising:
   (a) performing a first pass on first data values, each first data value being associated with one of the plurality of pixels in the image sensor array, the first pass comprising:
      (1) identifying the one or more bad pixels; and
      (2) storing information about the one or more bad pixels in a memory, wherein the first pass further includes checking whether the memory is sufficient for storing the information about the one or more bad pixels and when the memory is insufficient, marking the memory associated with the pixel with a memory overflow mark so that the subsequent pass will resume the first pass upon identifying the pixel associated with the memory overflow mark; and
   (b) performing one or more subsequent passes on subsequent data values, each subsequent data value being associated with one of the plurality of pixels in the image sensor array, the one or more subsequent passes comprising:
      (1) re-evaluating the one or more bad pixels previously identified based on the information stored in the memory; and
      (2) modifying the information stored in the memory if the re-evaluation identifies a change associated with the one or more bad pixels previously identified.

2. The method of claim 1 further comprising responding to a reset signal that initiates performing the first pass.

3. The method of claim 1 wherein performing the first pass occurs using first data values retrieved from the image sensor array when exposed to a dark environment.

4. The method of claim 1 wherein re-evaluating and modifying the information occur on a pre-determined interval.

5. The method of claim 1 wherein identifying the one or more bad pixels comprises determining into which of a plurality of categories each of the plurality of pixels is categorized, the plurality of categories including a first category for pixels meeting a first criterion and at least one other category representing pixels meeting other criteria.

6. The method of claim 5 wherein the first criterion and other criteria are adjustable.

7. The method of claim 5 wherein storing information comprises storing a category identifier in the memory if the pixel is categorized in one of the other categories and storing a location identifier associated with the pixel in the memory if the pixel is categorized in one of the other categories.

8. The method of claim 5 wherein re-evaluating the one or more bad pixels previously identified comprises re-determining into which of the plurality of categories the pixel is categorized.

9. The method of claim 1 wherein the one or more subsequent passes by-passes at least the step of modifying the information stored in the memory based on a pre-determined trigger.

10. The method of claim 1 wherein the first pass and the subsequent pass further comprise correcting the first data values and the subsequent data values associated with the one or more bad pixels, respectively.

11. The method of claim 10 wherein correcting the first data values and the subsequent data values includes interpolating corrected data values for the bad pixels based on one or more neighboring pixels to the bad pixels.

12. The method of claim 11 further comprising outputting the corrected data value for the one or more bad pixels and the data value and the subsequent data value for the other pixels during the first pass and the subsequent data, respectively.

13. The method of claim 1 wherein the change includes identifying the bad pixel as a good pixel.

14. A computer-readable medium having computer-executable instructions for performing the method of claim 1.

15. A computer-readable medium having a plurality of data structures stored thereon for storing information about one or more bad pixels out of a plurality of pixels in an image sensor array, comprising:
   at least one first data structure in the plurality of data structures comprising a location field and a status field,
   the status field having a category identifier that is assigned based on which of a plurality of categories the bad pixel is categorized within; and
   the location field having a location identifier that is associated with the location of the bad pixel, the plurality of data structures enabling an application program executed by a processor to perform bad pixel correction.

16. The computer-readable medium of claim 15 wherein each of the at least one first data structure corresponds to one of at least one section of the image sensor array.

17. The computer-readable medium of claim 15 wherein the plurality of categories includes a good category, a certainly good category, a possibly bad category, and a certainly bad category.

18. A computer-readable medium having a plurality of data structure stored thereon for storing information about one or more bad pixels out of a plurality of pixels in an image sensor array, comprising:
- at least one first data structure in the plurality of data structures comprising a location field and a status field, a category identifier being stored in the status field based on which of a plurality of categories the bad pixel is categorized and a location identifier associated with the bad pixel being stored in the location field; and
- at least one second data structure for storing an overflow mark that identifies the bad pixel being processed by a first pass when insufficient storage in the at least one first data structure occurs, such that during any subsequent passes, the first pass resumes processing of any remaining pixels out of the plurality of pixels based on the bad pixel identified by the overflow mark, the first and second data structures enabling an application program executed by a processor to perform bad pixel correction.

19. An apparatus that uses an image sensor array having one or more bad pixels out of a plurality of pixels, the apparatus comprising:
  (a) a processor coupled to the image sensor array having the plurality of pixels arranged in one or more sections;
  (b) a memory coupled to the processor; and
  (c) a logic component, that, in conjunction with the processor and the memory, is configured to perform a first pass on first data values, each data value being associated with one of the plurality of pixels in the image sensor array and to perform one or more subsequent passes on subsequent data values, each subsequent data value being associated with one of the plurality of pixels, wherein the first pass comprises:
    (1) identifying the one or more bad pixels; and
    (2) storing information about the one or more bad pixels in the memory, wherein the first pass further includes checking whether the memory is sufficient for storing the information about the one or more bad pixels and when the memory is insufficient, marking the memory associated with the pixel with a memory overflow mark so that the subsequent pass will resume the first pass upon identifying the pixel associated with the memory overflow mark; and wherein the one or more subsequent passes comprises:
    (1) re-evaluating the one or more bad pixels previously identified based on the information stored in the memory; and
    (2) modifying the information stored in the memory if the re-evaluation identifies changes associated with the one or more bad pixels previously identified.

20. The apparatus of claim 19 wherein identifying the one or more bad pixels comprises determining into which of a plurality of categories each of the plurality of pixels is categorized, the plurality of categories including a first category for pixels meeting a first criteria and at least one other category representing pixels meeting other criteria.

21. The apparatus of claim 19 wherein the processor is configured to adjust the first criterion and other criteria.

22. The apparatus of claim 19 further comprising a reset signal that communicates with the logic component to determine when to perform the first pass.

23. A data structure embodied on a computer readable medium for storing information, comprising:
- a plurality of attribute fields, including a corresponding attribute field for each pixel of a plurality of pixels in an image sensor array, wherein
  - each attribute field comprises a first bit and a second bit;
  - for each pixel identified as a bad pixel, the first bit of the corresponding attribute field is set to a first state;
  - for each pixel identified as a good pixel, the first bit of the corresponding attribute field is set to a second state; and wherein
  - for each of the pixels, the second bit of the attribute field stores an additional category identifier, the plurality of attribute fields enabling an application program executed by a processor to perform bad pixel correction.

24. The computer-readable medium of claim 23, wherein each of the attribute fields represents a state selected from a plurality of states including: a good state, a certainly good state, a possibly bad state, and a certainly bad state.

* * * * *